APERTURE CORRECTION CIRCUITS

Filed Oct. 28, 1955 2 Sheets-Sheet 1

SIMPLIFIED APERTURE CORRECTION CIRCUIT 51

INVENTOR.
ARCH C. LUTHER, JR.
BY
ATTORNEY

Nov. 17, 1959 | A. C. LUTHER, JR | 2,913,540

APERTURE CORRECTION CIRCUITS

Filed Oct. 28, 1955 | 2 Sheets-Sheet 2

INVENTOR.
ARCH C. LUTHER, JR.
BY
[signature]
ATTORNEY

United States Patent Office 2,913,540

Patented Nov. 17, 1959

2,913,540

APERTURE CORRECTION CIRCUITS

Arch C. Luther, Jr., Merchantville, N.J., assignor to Radio Corporation of America, a corporation of Delaware Application October 28, 1955, Serial No. 543,387

4 Claims. (Cl. 179—171)

The present invention relates to a simplified aperture equalizer circuit for providing aperture correction of a signal provided by a television camera tube.

Aperture distortion is caused by the finite size of the scanning beams employed in television camera tubes and kinescopes and by lens aberrations in the optical system. It is apparent that a large scanning aperture will cover several picture elements simultaneously, reproducing them as a blur. Horizontal resolution improves as the size of the scanning aperture is decreased provided that the bandwidth of the system is sufficient to pass the higher video frequencies thereby generated.

The more general aspects of aperture compensation have been discussed by R. C. Dennison in his paper "Aperture Compensation for Television Cameras" in the RCA Review, December 1953. This paper shows that in general an aperture correction circuit should provide the following features: (A) it should provide a controllable boost in video gain rising with frequency and having a peak at or near $f_p$; $f_p$ is the frequency at which the lines and spaces will merge together into a uniform grey blur when the horizontal resolution wedge of a test chart is televised. The shape of the rising gain characteristic should be substantially complementary to the attenuation caused by the aperture distortion. In practice, a cosine shaped response has been found to provide a satisfactory approximation. (B) an aperture correction circuit should also introduce a phase shift which is either identically zero or which varies linearally with frequency.

In circuits of the type described by Dennison, separate circuits are provided for transmission of camera signal and for developing the camera signal modified by a cosine shaped response; the camera signal and the cosine-response modified camera signal are added together using a plurality of coupling circuits to produce an aperture corrected signal.

It is an object of this invention to provide a simplified aperture correction circuit.

It is another object of this invention to provide a simplified filter aperture equalizer which may be built into a single stage of a video amplifier.

According to the invention a delay line is arranged to be driven by a video signal in a manner whereby both the video signal modified in amplitude by a constant transmission factor and the video signal modified by a cosine shaped response are transmitted through the delay line and combined in the same timing at the output of the delay line to yield the aperture corrected video signal.

In one form of the invention, the higher frequencies of the video signal are aperture corrected by the above described means and thereupon combined with low frequency components of the video signal provided through a separate low frequency path.

Other and incidental objects of this invention will become apparent upon a reading of the following specification and a study of the figures, where:

Figures 1, 2:
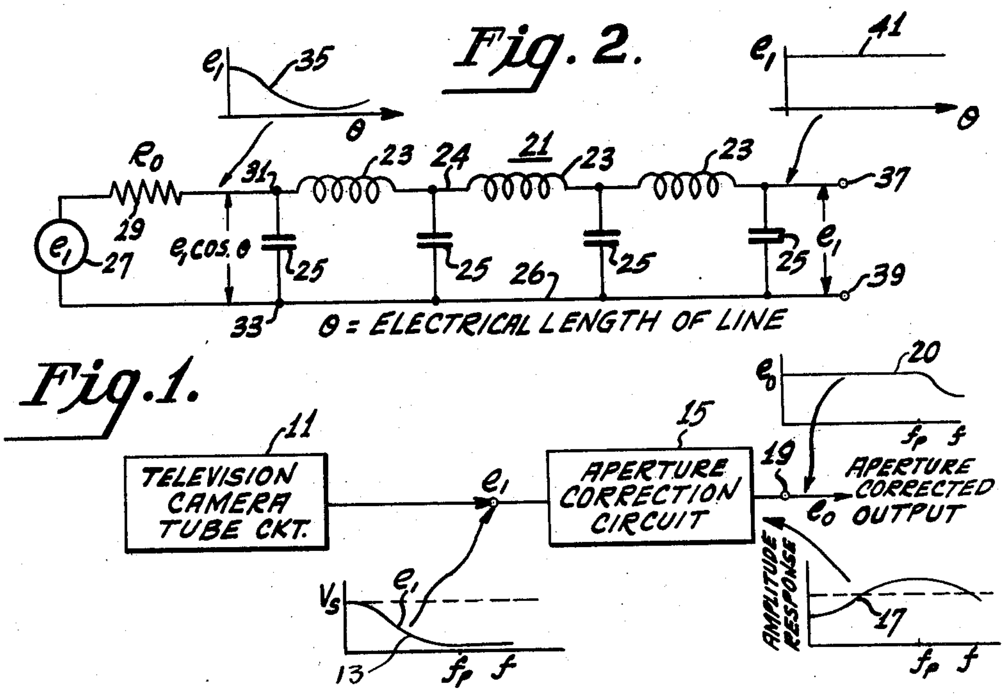
Figure 1 is a block diagram of one circuit using the present invention.
Figure 2 is a schematic diagram of a transmission line having transmission characteristics pertinent to the present invention.

In the circuit of Figure 1, a television camera tube circuit 11 develops an output voltage which varies with frequency substantially along the curve 13. This voltage versus frequency relationship over the useful frequency band, is substantially of the form $e_1 = V_s \cos \theta$ where $\theta = \omega\tau$; $\tau$ being a constant of the circuit. The output of the television camera tube circuit is passed through the aperture correction circuit 15 having a voltage-versus-frequency characteristic 17 which can be described in the approximate form of $V_s(1 - K \cos \theta)$ where K is a constant; the aperture corrected output signal $e_0$ developed at the output terminal 19 will be a signal wherein the voltage level is substantially constant with frequency, as illustrated by the line 20, up to the frequency $f_p$. The present invention will provide an improved aperture correction circuit 15 which may be built into a single stage video amplifier and which is of simplified design.

Before considering an aperture correction circuit of the present invention, consider the open-circuited lossless transmission line 21 shown in Figure 2. This transmission line 21 has one path 24 including series arms consisting of the inductances 23 and a second path 26 consisting of a conductor; the shunt arms consisting of the condensers 25 coupled between these paths. The characteristic impedance of the transmission line is $R_0$. Let a generator 27 having an internal impedance $R_0$ and producing a signal $e_1$, having a prescribed amplitude versus frequency relationship, furnish the signal $e_1$ to the input terminals 31 and 33 of the transmission line 21. Since this transmission line is open-circuited and lossless, $e_1$ will be modified in amplitude as a function of frequency by the input impedance of the transmission line 21 according to the cosine function illustrated by the curve 35. The signal developed across terminals 31 and 33, due to $e_1$ from the generator 27 thereupon becomes $e_1 \cos \theta$ where $\theta$ is the electrical length of the transmission line; $\theta$ is expressable as $\omega\tau$ where $\tau$ is the time delay of the transmission line. The signal produced at the output terminals 37 and 39 of the transmission line 21 will be the generator signal $e_1$ having the same phase as at the generator and unmodified in amplitude level as a function of frequency according to the straight-line curve 41. It is to be appreciated that curves 35 and 41 refer to voltage versus frequency curves characteristics of the transmission and impedance properties of the transmission line 21 and do not describe the voltage versus frequency characteristics of the signal $e_1$ produced at the generator 27.

In aperture correction circuits described by Dennison, and used in conjunction with a television camera tube signal of the type $e_1 = V_s \cos \theta$, the signal $e_1 \cos \theta$ produced at terminals 31 and 33 is subtracted from $e_1$ produced at output terminals 37 and 39 using suitable and separate circuits having proper gain to yield an aperture corrected version of the television camera tube signal.

Figure 3:
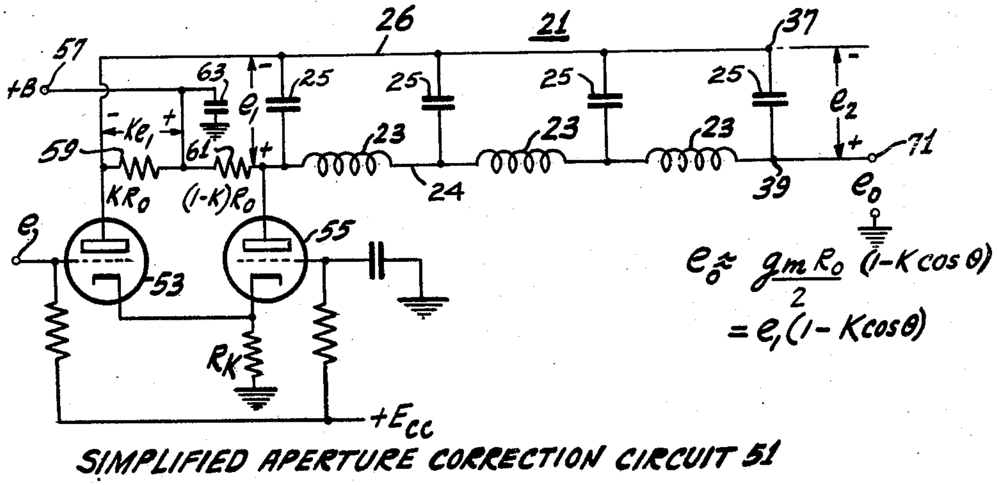
Figures 3 and 4 are schematic diagrams of forms of the present invention.

Figure 3 is a schematic diagram of a simplified aperture correction circuit 15 of the present invention. The simplified aperature correction circuit 15 includes a transmission line 21. The input signal $e_1$ from the television camera tube, constituting the signal to be aperture corrected, is applied to the control grid of tube 53. Tube 55 is cathode driven by tube 53 such that the signal currents in tubes 53 and 55 are substantially equal and opposite. The anode of tube 53 is coupled to the B+ terminal 57 by way of the anode resistor 59. The anode of tube 55 is coupled to the B+ terminal 57 by way of the anode resistor 61. Anode resistors 59 and 61 have amplitudes described as $KR_0$ and $(1-K)R_0$, respectively. The condenser 63 provides an A.-C. ground to the point common to both anode resistors 59 and 61.

The television camera signal $e_1$, essentially speaking, will pursue a pair of paths 24 and 26 through the transmission line 21. The television camera signal $e_1$, developed in one polarity across the anode resistor 59, and modified by the aforementioned cosine function and the constant K, will pass along the conductor 26 constituting the other series path of the transmission line and be developed between the output terminal 71 of the transmission line 21, and ground. The television camera tube signal $e_1$ developed across the anode resistor 61 will pass through the transmission line 21 which will develop this signal, with a substantially constant voltage versus frequency characteristic and with no change in phase or polarity at the output terminal 39. The two signals developed across the anode resistors 59 and 61 will be combined at the common output terminal 71 with polarities suitable to develop an output voltage $e_0$ constituting $e_1(1-K \cos \theta)$ between output terminal 71 and ground; the output voltage $e_0$ is thereupon corrected for the voltage versus frequency characteristic of the television camera signal $e_1$ as produced at the television camera.

$e_1$ is also expressible by the equation $$\frac{g_m R_0}{2}(1-K \cos \theta)$$

where $g_m$ is the transconductance of tubes 53 and 55 and $\theta$ is the electrical length of the transmission line 21. The cosine peaking will take place at the frequency $f_p$ where the transmission line 21 is a half-wavelength line; i. e. $\theta=\pi$.

The simplified aperture correction circuit 51 of Figure 3 has thereupon combined the television camera tube signal, simultaneously modified by a pair of prescribed voltage versus frequency characteristics, in a single transmission line circuit which is coupled in a unique fashion between the anode resistors 59 and 61 of the tubes 53 and 55, respectively, and the terminal 71. By arranging the simplified aperture correction circuit 51 in this fashion, the need for additional amplifier and signal subtraction circuits is eliminated. The circuit of the invention is easily controllable and may be driven by a single stage of a video amplifier including a pair of tubes 53 and 55 within a single glass envelope.

The factor K which is dependent upon the ratios of the magnitudes of the anode resistors 59 and 61 may be varied by having anode resistors 59 and 61 form a potentiometer with the voltage from the B+ terminal 57 attached to the sliding contact of the potentiometer. This will provide a gain or boost control; the peak boost $B_p$ at a frequency when $\theta$ equals $\pi$ is related to K by the expression $$B_p=\frac{1+K}{1-K}$$

As K is increased to provide a higher boost, the low frequency gain of the simplified aperture correction circuit 51 will fall off. The low frequency gain of this circuit is related to $(1-K)R_0$ which provides the low frequency load resistance. Since $R_0$ is seldom larger than 500 ohms, a simplified aperture correction circuit 51 designed for very high boost will have low gain.

Figures 4, 5:
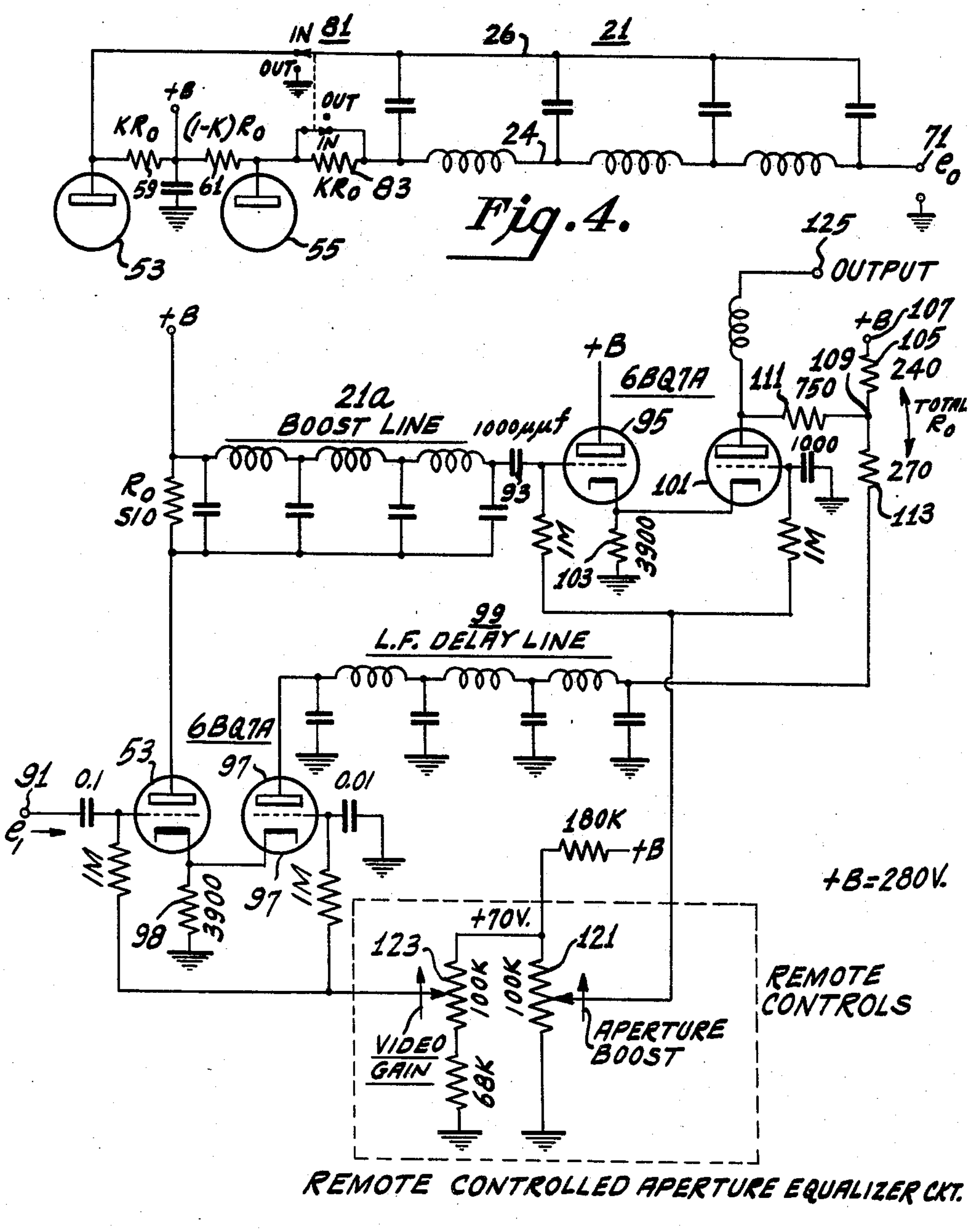
Figure 5 is a form of the present invention having a separate circuit for handling low frequencies of a video signal wherein improved means for video gain and aperture boost control are provided.

The simplified aperture correction circuit 51 may be altered as shown in Figure 4 to provide the feature whereby a fixed boost may be provided by a simple in-out switch 81 included in both paths 24 and 26. In the simplified aperture correction circuit 51 of Figure 4, a resistance 83 is connected between the anode of tube 55 and the transmission line 21. The in-out switch 81 will provide the condition whereby when this switch is in the "in" position, resistor 83 is short-circuited and the simplified aperture correction circuit is substantially that shown in Figure 3. When the switch 81 is in the "out" position, the common side 65 of the transmission line 21 is returned to ground so that only signal developed across load resistor 61 is transmitted to the output terminal. Resistor 83, which is equal in magnitude to resistor 59 is introduced to maintain proper sending end termination of the transmission line 21.

The aperture correction circuits 51 of Figures 3 and 4 are capable of being adapted to provide an additional feature. In the circuit of Figure 3, the control grid of tube 55 is A.-C. grounded; this ground may be removed and an extra signal applied to this control grid. Tube 55 may also be a tube having a plurality of control grids; an extra signal can be thereupon introduced into the signal from the television camera tube by applying this extra signal or signals to one of the control grids of tube 55.

When a simplified aperture correction circuit 51 of Figure 3 is designed so that K is made equal to unity, then, for all practical purposes, tube 55 does not contribute signals to the transmission line and the response of the transmission line circuit at terminal 71 will be proportioned to $(1-\cos \theta)$, which is substantially zero at low frequencies. Thus the aperture correction circuit for the case where $K=1$, will provide signal transfer only at the high frequencies; the high frequency components may be handled separately and added to low frequency components of the television camera tube signal provided through a low frequency filter having proper delay. An aperture correction circuit using this principle and incorporating an electronic remote boost control is schematically diagrammed in Figure 5.

The signal from the television camera tube is applied to the input terminal 91 and used to drive tube 53 which in turn transmits this signal through the transmission line 21A which is now coupled in an arrangement corresponding to the circuit of Figure 3 when $K=1$ for that circuit. The output of the transmission line 21A, referred to as a boost line, is applied to the control grid of the tube 95 by way of the capacitor 93.

At the same time, the tube 53, to which is applied the television camera tube signal, is used to cathode-drive the tube 97 by way of the cathode resistor 98. Tube 97 drives a delay line 99 which is designed to have delay characteristics related to the delay accorded the high frequency components by the circuit associated with transmission line 21A and to pass all frequencies of the television camera tube signal. This delay line 99 corresponds in transmission characteristics to line 21A which provides the high frequency aperture correction signal.

Tube 95, to which the output of the boost line 21A is applied, cathode-drives the tube 101 by way of the cathode resistor 103. A resistor 105 serving as a common load to both tubes 101 and 97 is coupled from the B+ terminal 107 to the potential terminal 109. Resistors 111 and 113 which determine the extent of common coupling between tubes 101 and 97 are coupled respectively to the anode of tube 101 and by way of the delay line 99 to the anode of tube 97. The control grids of tubes 95 and 101 are biased by potentials developed across the potentiometer 121.

The gain of tube 53, to which the television camera tube signal is applied, is controlled by the grid bias derived from the potentiometer 123. An output signal for the circuit of Figure 5 is obtainable at the output terminal 125. This output signal is made up of contributions of signals developed by current passing through resistors 111, 105 and 113.

Potentiometer 123 controls the gain of the television camera tube signal in the tube 53. The potentiometer 121 controls the gain of tubes 95 and 101, and therefore the boost of the aperture corrected signal. Potentiometers 121 and 123 may be located at a position remote from the rest of the circuit so as to make the aperture correction afforded by the circuit of Figure 5 amenable to remote control by a television studio operator.

In the remote controlled aperture equalizer circuit of Figure 5, no interaction takes place in the circuit between the potentiometers 121 and 123; control of the video gain by the potentiometer 123 will have no effect on the boost circuit which is controlled by potentiometer 121 and vice versa. In practice, extra grids in tubes 53, 97, 95 or 101 may be employed to introduce other signals into the television camera tube signal.

Having described the invention, what is claimed is:

1. An aperture distortion correction circuit comprising in combination; a transmission line having a first and second input terminal and a pair of transmission paths including series and shunt impedance arms with the series impedance arms arranged only along one path and wherein shunt impedance arms are connected between prescribed points between the series impedance arms in one path and the other path, said transmission line arranged as an open-circuited lossless transmission line and having an output terminal at the end of said path which includes said series impedance arms, a fixed potential terminal, a source of signals representing an image, a sending end impedance coupled between said pair of input terminals and suitable to provide sending end termination of said transmission line, means to apply said signals at a first amplitude level with respect to said fixed potential terminal to one input terminal and at a second amplitude level with respect to said fixed potential terminal to said second input terminal to develop an aperture corrected signal also representing said image between said output terminal and said fixed potential terminal.

2. An aperture distortion correction circuit comprising in combination, a source of signals representing an image, first and second electron discharge devices each having an output circuit comprising a respective load impedance, one of said load impedances having a value equal to $KR_0$ and the other of said load impedances having a value of $(1-K)R_0$, where K is a constant, means for coupling said devices to said source such that said signals are developed in push-pull relationship across one of said load impedances in a first polarity and across the other of said load impedances in a polarity opposite to said one polarity, an open-circuited lossless transmission line having a pair of input terminals and having an output terminal at the open end thereof, said transmission line having a characteristic impedance substantially equal to $R_0$, means including one of said load impedances for connecting one of said pair of input terminals to a point of alternating current reference potential, and means including the other of said load impedances for connecting the other of said pair of input terminals to said point of alternating current reference potential, whereby an aperture distortion corrected image representative signal appears between said output terminal and said point of alternating current reference potential, said corrected image signal corresponding to the signal output of said source modified by the function $1-K \cos \theta$, where $\theta$ is the electrical length of said transmission line.

3. An aperture distortion correction circuit comprising, in combination, a source of video signals, a transmission line open at its receiving end and terminated at its sending end, and comprising a plurality of inductances connected in series between a first input terminal at said sending end and an output terminal at said receiving end, and a plurality of capacitances connected between terminals of said inductances and a second input terminal at said sending end, the termination at said sending end comprising a first impedance connected between said first input terminal and a point of signal reference potential and a second impedance connected between said second input terminal and said point of signal reference potential, means for applying signals from said source to said first input terminal in a first polarity, and means for applying signals from said source to said second input terminal in a polarity opposite to said one polarity.

4. Apparatus in accordance with claim 3 wherein said first-named signal applying means comprises a first electron discharge device having a cathode, control grid and anode, said anode being connected to said first input terminal, and said control grid being coupled to said source, and wherein said second-named signal applying means comprises a second electron discharge device having a cathode, control grid and an anode, the anode of said second device being connected to said second input terminal, and the cathode of said second device being connected to the cathode of said first device.

References Cited in the file of this patent

UNITED STATES PATENTS

| | | |
|---|---|---|
| 2,227,906 | Kellogg | Jan. 7, 1941 |
| 2,243,599 | Herbst | May 27, 1941 |
| 2,266,154 | Blumlein | Dec. 16, 1941 |
| 2,299,875 | Bedford | Oct. 27, 1942 |
| 2,617,883 | Anger | Nov. 11, 1952 |
| 2,642,552 | Sager | June 16, 1953 |
| 2,678,389 | Loughlin | May 11, 1954 |
| 2,698,900 | Anger | Jan. 4, 1955 |

OTHER REFERENCES

Publication, RCA Review, December 1953, vol. XIV, No. 4, pages 569–585, "Aperture Compensation for Television Cameras," by Dennison. (Copy in Div. 51.)